June 30, 1959  I. A. HARVEY  2,892,267
EDUCATIONAL DEVICE FOR USE IN TEACHING ARITHMETIC
Filed Feb. 28, 1956
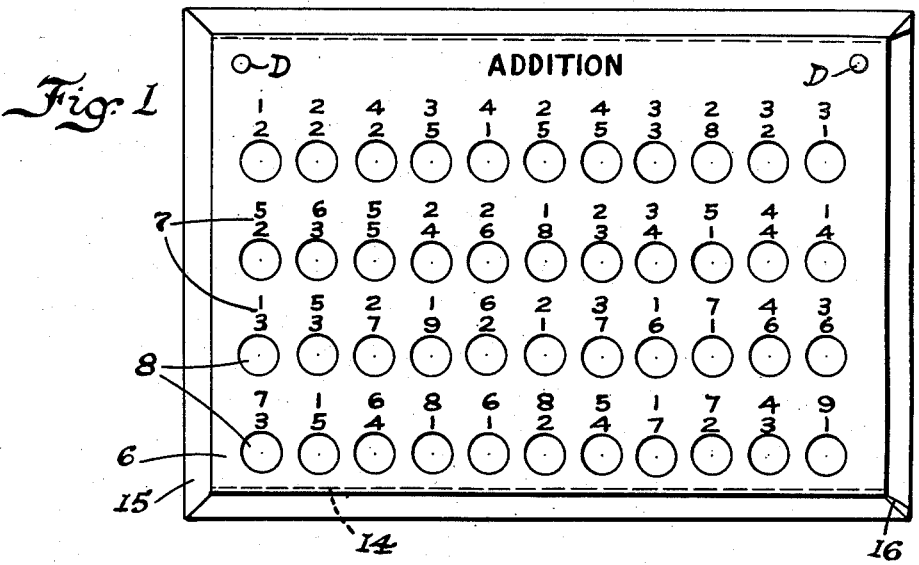
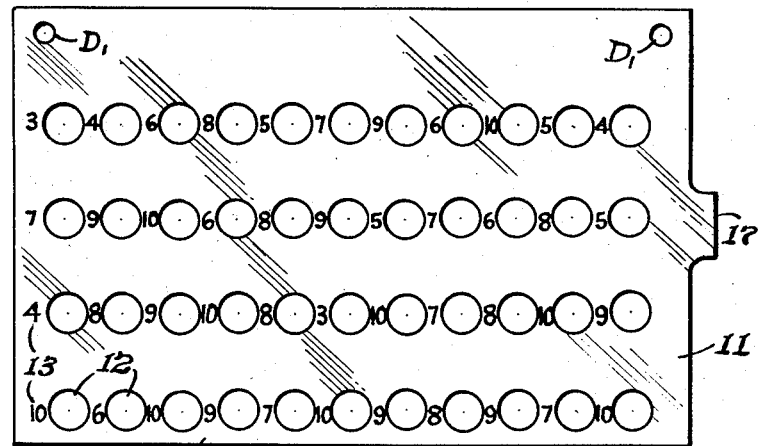
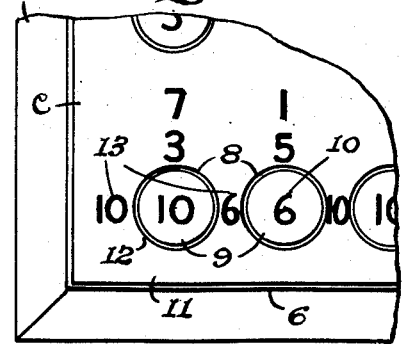
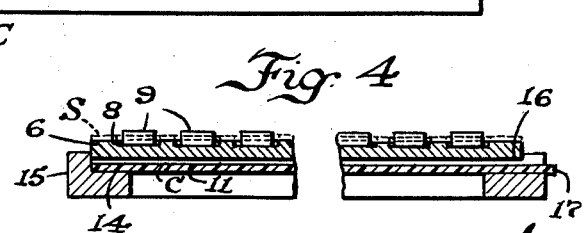
Inventor
Ione A. Harvey

United States Patent Office 2,892,267
Patented June 30, 1959

2,892,267
EDUCATIONAL DEVICE FOR USE IN TEACHING ARITHMETIC

Ione A. Harvey, Rockford, Ill.

Application February 28, 1956, Serial No. 568,372

2 Claims. (Cl. 35—31)

This invention relates to a new and improved educational device designed to facilitate the teaching of arithmetic in the lower grades.

The principal object of my invention is to save time both for the pupils and the teacher in the handling of simple addition, subtraction, division and multiplication problems, by eliminating a lot of written work and simplifying the checking of answers. The old practice of having pupils write out the problems and answers on a sheet and hand them in for correction imposed considerable tedious and time-consuming labor on the teacher in the checking over of all of the answers, because the problems and answers were invariably not arranged in the same order on each sheet.

In accordance with my invention, the pupil, or a group of pupils working the problems together, is furnished with a board on which all of the problems are arranged in a predetermined order, and disks bearing numbers for answers are furnished to be placed in recesses provided in the board under all of the problems, thereby facilitating the performance of addition, multiplication, division and subtraction operations in so far as the pupils are concerned. The disks project from the recesses appreciably and fit loosely enough in the recesses to enable easy insertion and removal. The extent of projection of the disks is also of advantage when one places over the board a check-sheet bearing numbers adjacent all of the holes provided in the sheet which are the correct answers for the problems. In that way, if the teacher is doing the checking and grading, he or she can tell almost at a glance whether all of the problems have been done correctly, and a lot of time that would otherwise be wasted is saved and may be used for other and more productive work. Also, the handling of the disks seems to appeal to youngsters as real fun and while they are more or less playing at the game of placing the right disks in the right places they are really learning arithmetic better than by the old method, and the subject also ceases to be a chore.

The invention is illustrated in the accompanying drawing, in which

Fig. 1 is a face view of a problem board made in accordance with my invention, the one shown being for addition, although others for subtraction, multiplication and division may be provided of similar construction;

Fig. 2 is a face view of the clear plastic checking sheet provided in accordance with my invention for use with the problem board shown in Fig. 1;

Fig. 3 is an isometric view of one of the numbered answer disks of which a series is provided to be placed in the recesses in the problem board of Fig. 1;

Fig. 4 is a fragmentary longitudinal section through the board of Fig. 1 showing how the answer sheet is adapted to be stored in a compartment provided therefor in the base; and Fig. 5 is an enlarged fragmentary plan view showing one corner of the board with the answer sheet superimposed thereon for the checking of answers.

The same reference numerals are applied to corresponding parts throughout the views.

Referring to the drawing, the reference numeral 6 designates the problem board which may be made of wood or of any suitable plastic material having problems printed or otherwise displayed thereon, as at 7, in rows, each problem being disposed adjacent a circular recess 8 that is adapted to receive a circular disk 9, of which a plurality will be provided, at least one for each of the forty-four recesses shown. These disks 9 bear numbers as shown at 10 in Figs. 3 and 5, which serve as the answers to the problems, and it is therefore up to the pupil, or pupils, only to place the right disk in each recess, if a grade of 100 is to be earned. The handling of these disks and placing them where they belong seems to make a deeper impression on the mind of the youngster than the mechanics of writing numbers. I have found also that youngsters regard the handling of the board and disks as more or less like playing, whereas they are inclinded to regard writing their problems as more or less work. Thus, they will gladly spend more time in the use of the board 6 and disks 9 and thereby learn arithmetic better this way than by the old method. Groups and individuals will vie with one another in the speed and accuracy of filling in the answers, and such competition is, of course, all to the good. Teachers using these boards in their classrooms find they have more leisure time and more time to spend on other useful work, because there is less time wasted on checking and grading papers. The teacher can check all of the answers for forty-four problems at a glance by merely placing a check-sheet 11 over the board 6, the sheet 11 having circular holes 12 provided therein registering with the recesses 8 and accommodating the disks 9, as seen in Fig. 5, and having the correct answers thereon for all of the problems adjacent the holes 12, for easy comparison with the numbers on the disks.

The check-sheet 11 is preferably of clear flexible plastic material, although any other opaque material could also be used, inasmuch as the only operation to be performed is that of checking the correct answers 13 with those given on the disks 9 placed in the recesses 8. It is believed, however, that a transparent check-sheet is best from the pupil's standpoint, because in checking his or her answers the problems can still be seen through the sheet and the details of each problem are thereby more definitely fixed in mind. The pupil thereby confirms the fact that his solution of each problem is correct, if it is. When not in use, the sheet 11 may be conveniently slipped into a storage compartment 14 provided in the board supporting frame or base 15, the compartment being open at one end as indicated at 16. A projecting tab 17 on one end of the sheet 11 serves as a convenient handle in the removal and replacement of the sheet.

While I have shown the problems in "addition" as printed on the board 6, it will be understood that these may be printed on a removable sheet, indicated at S in dotted lines in Fig. 4, of the same size as the top of board 6, perforated in register with recesses 8, and suitably held in register with the top of the board. In that way one board 6 may be used interchangeably with sheets S, $S_1$, $S_2$, and $S_3$, containing problems in simple addition, multiplication, division and subtraction. In like manner, a number of perforated check sheets C, $C_1$, $C_2$, and $C_3$ may be provided containing the correct answers, although only one sheet 11, corresponding to sheet C of the series, is shown. In other words, while the disks 9 are shown in Fig. 5 as serving to hold the check-sheet 11 (or C) in place, these disks 9 may also hold a problem sheet S, or S₁, or S₂, or S₃ in place, under the check-sheet, or dowel pins, as indicated at D in Fig. 1 may be provided on the board 6 fitting in holes D₁ in the problem sheet and registering holes D₁ provided in the check sheet. The compartment 14 may be as large as necessary to accommodate whatever number of check sheets and problem sheets are provided.

In operation, the pupil (or pupils) sorts out the disks 9, arranging them in numerical order for convenience in handling, so that there is less time consumed in finding and placing the proper disk in each recess 8. After all of the problems in addition (or subtraction, division, or multiplication) are performed, the pupil may check his work with the sheet 11, or if the matter is a test, the teacher may do that and grade the pupil's work. The advantages derived have all been outlined above.

It is believed the foregoing description conveys a good understanding of the objects and advantages of my invention. The appended claims have been drawn to cover all legitimate modifications and adaptations.

I claim:

1. In combination, an arithmetic problem board having a plurality of problems in simple addition, subtraction, division, or multiplication posted thereon in a certain arrangement, said board having circular recesses of uniform diameter and depth provided therein adjacent said problems, a plurality of answer elements inserted freely in said recesses and projecting therefrom, the answer elements being all of a common diameter, smaller than said recesses and of a common thickness that is large in relation to the depth of said recesses, and a transparent check-sheet adapted to be superimposed on said board and having circular openings of uniform diameter provided therein in register with said recesses and of a size in relation to the answer elements freely receiving said projecting answer elements to maintain registration of the check-sheet with said board, said check-sheet having posted thereon adjacent each opening the correct answer for the problem associated with the mating recess, whereby to permit easy checking for correctness of answers on answer elements inserted in the recesses.

2. The combination as set forth in claim 1, including separate problem sheets carrying the addition, subtraction, division, and multiplication problems thereon for posting on the board in a certain arrangement, one of said sheets being used at a time, the board having means for holding the individual sheets in register therewith and the sheets having circular openings provided therein registering with the circular recesses in the board, the circular openings being disposed adjacent the problems, and there being a separate check-sheet for each problem sheet adapted to be superimposed on the board with openings provided therein in register with the openings in the problem sheets to receive the projecting answer elements, each check-sheet having posted thereon adjacent each opening the correct answer for the problem associated therewith.

References Cited in the file of this patent

UNITED STATES PATENTS

| | | |
|---|---|---|
| 641,739 | Thompson | Jan. 23, 1900 |
| 1,624,450 | Vershbinsky | Apr. 12, 1927 |
| 2,137,736 | Watkins | Nov. 22, 1938 |
| 2,213,225 | Maggioni | Sept. 3, 1940 |
| 2,497,200 | Appel | Feb. 14, 1950 |
| 2,503,130 | Poritz | Apr. 4, 1950 |
| 2,611,193 | Davis | Sept. 23, 1952 |
| 2,703,459 | Paquette | Mar. 8, 1955 |

FOREIGN PATENTS

| | | |
|---|---|---|
| 276,153 | Germany | July 6, 1914 |
| 260,369 | Great Britain | Nov. 4, 1926 |